US012625027B2

(12) United States Patent
Zheng et al.

(10) Patent No.: US 12,625,027 B2
(45) Date of Patent: May 12, 2026

(54) TEST METHOD, TEST APPARATUS, TEST SYSTEM, AND STORAGE MEDIUM

(71) Applicant: CONTEMPORARY AMPEREX TECHNOLOGY (HONG KONG) LIMITED, Hong Kong (CN)

(72) Inventors: Hongyu Zheng, Ningde (CN); Shaoteng Ren, Ningde (CN); Si Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 300 days.

(21) Appl. No.: 18/346,498

(22) Filed: Jul. 3, 2023

(65) Prior Publication Data

US 2024/0133764 A1    Apr. 25, 2024
US 2024/0230451 A9    Jul. 11, 2024

Related U.S. Application Data

(63) Continuation of application No. PCT/CN2023/082923, filed on Mar. 21, 2023.

(30) Foreign Application Priority Data

Oct. 19, 2022    (CN) .......................... 202211281900.9

(51) Int. Cl.
*G01M 3/04*    (2006.01)

(52) U.S. Cl.
CPC ..................................... *G01M 3/04* (2013.01)

(58) Field of Classification Search
None
See application file for complete search history.

(56) References Cited

U.S. PATENT DOCUMENTS

| | | | | | |
|---|---|---|---|---|---|
| 11,469,473 | B1 * | 10/2022 | Wiegman | ............ | H01M 50/249 |
| 2013/0065093 | A1 | 3/2013 | White et al. | | |
| 2013/0149625 | A1 | 6/2013 | Ikeya | | |
| 2019/0033164 | A1 * | 1/2019 | Ing | ....................... | G01M 3/3236 |
| 2022/0077515 | A1 * | 3/2022 | Leyvi | .................. | H01M 10/425 |

(Continued)

FOREIGN PATENT DOCUMENTS

| | | |
|---|---|---|
| CN | 107469257 A | 12/2017 |
| CN | 107680355 A | 2/2018 |

(Continued)

OTHER PUBLICATIONS

English translation of CN 214706023 (Year: 2025).*

(Continued)

*Primary Examiner* — Mark A Shabman
(74) *Attorney, Agent, or Firm* — Ladas & Parry LLP

(57) ABSTRACT

A test method, a test apparatus, a test system, and a storage medium are provided, so as to solve the technical problem of how the leakage of a battery cell is detected. The test method of this embodiment of this application includes: (S10) obtaining a CAN signal output by a gas sensor, where the gas sensor is disposed on a test box, and a battery cell is placed in the test box; (S20) determining a gas concentration of a predetermined gas in the test box based on the CAN signal; and (S30) sending a concentration exceedance signal when the gas concentration is higher than a concentration threshold.

12 Claims, 4 Drawing Sheets

(56) References Cited

U.S. PATENT DOCUMENTS

| | | | | |
|---|---|---|---|---|
| 2022/0311032 A1* | 9/2022 | Nishio | .............. | H01M 8/04753 |
| 2023/0142289 A1* | 5/2023 | Wang | .................. | H01M 10/482 |
| | | | | 429/90 |

FOREIGN PATENT DOCUMENTS

| | | | |
|---|---|---|---|
| CN | 107959066 A | | 4/2018 |
| CN | 108258345 A | | 7/2018 |
| CN | 109345782 A | | 2/2019 |
| CN | 109387341 A | | 2/2019 |
| CN | 208522055 U | | 2/2019 |
| CN | 110988714 A | | 4/2020 |
| CN | 112763912 A | | 5/2021 |
| CN | 113176512 A | | 7/2021 |
| CN | 214706023 U | * | 11/2021 |
| CN | 114267158 A | | 4/2022 |
| CN | 115009026 A | | 9/2022 |
| CN | 115117470 A | | 9/2022 |
| CN | 115808267 A | | 3/2023 |
| KR | 102051809 B1 | | 12/2019 |
| WO | 2022055310 A1 | | 3/2022 |

OTHER PUBLICATIONS

Decision to Grant a Patent dated Jul. 22, 2025 for application EP 23734129.2.

M. Wenger et al., Investigation of gas sensing in large lithium-ion battery systems for early fault detection and safety improvement, IECON 2014—40th Annual Conference of the IEEE Industrial Electronics Society, Dallas, TX, USA, 2014, pp. 5654-5659, doi: 10.1109/IECON.2014.7049366.

D. He et al., Thermal Runaway Warning Based on Safety Management System of Lithium Iron Phosphate Battery for Energy Storage, 2020 IEEE International Conference on Artificial Intelligence and Information Systems (ICAIIS), Dalian, China, 2020, pp. 577-582.

Extended European Search Report for Application No. 23734129.2, mailed on Oct. 17, 2024, 11 pages.

First Office Action for Application No. 202211281900.9, mailed on Apr. 30, 2025, 11 pages.

Wang Zuowei et al., Geostationary Orbit Satellite Attitude Orbit Control Technology, Sep. 2021, pp. 399-403.

International Search Report dated Jul. 5, 2023 for Application No. PCT/CN2023/082923.

Chinese Office Action dated Aug. 13, 2025 for application CN 202211281900.9.

Luo Dehan et al., China University of Science and Technology Press, "Machine olfaction", 14 pages.

Jin Yang, Machinery Industry Press, "Early Safety Warning and Protection for Lithium-ion Battery Energy Storage Power Stations", 7 pages.

Chinese Rejection for copending Application No. 202211281900.9 dated Jan. 6, 2026.

Fengchong Lan and Jiqing Chen; Key Technology of automotive battery; Oct. 29, 2025.

* cited by examiner

TEST METHOD, TEST APPARATUS, TEST SYSTEM, AND STORAGE MEDIUM

CROSS-REFERENCE TO RELATED APPLICATIONS

This application is a continuation of International application PCT/CN2023/082923 filed on Mar. 21, 2023 that claims priority to Chinese Patent Application No. 202211281900.9 filed on Oct. 19, 2022, which is incorporated herein by reference in its entirety.

TECHNICAL FIELD

This application relates to the field of battery technologies, and in particular, to a test method, a test apparatus, a test system, and a storage medium.

BACKGROUND

Energy saving and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development. During tests in the battery research and development stage, battery cells are prone to failure or suffer from leakage caused by corrosion and rupture of the housing. When a battery cell suffers from leakage, moisture easily enters the battery cell, leaving the battery cell at risk of thermal runaway. Therefore, how the leakage of a battery cell is detected has become a technical problem to be solved.

SUMMARY

Embodiments of this application provide a test method, a test apparatus, a test system, and a storage medium, so as to solve the technical problem of how the leakage of a battery cell is detected.

The test method of the embodiments of this application is used for battery cells. The test method includes:
    obtaining a CAN signal output by a gas sensor, where the gas sensor is disposed on a test box, and a battery cell is placed in the test box;
    determining a gas concentration of a predetermined gas in the test box based on the CAN signal; and
    sending a concentration exceedance signal when the gas concentration is higher than a concentration threshold.

In the test method of the embodiments of this application, the concentration of the predetermined gas in the test box is monitored using the gas sensor disposed on the test box, and the concentration exceedance signal is sent when the gas concentration is higher than the concentration threshold. In this way, it is possible to determine, based on the gas concentration, whether the battery cell has a leakage failure.

In some embodiments, the determining a gas concentration of a predetermined gas in the test box based on the CAN signal includes:
    reading internal data of the gas sensor based on the CAN signal; and
    determining the gas concentration of the predetermined gas based on the internal data.

In this way, the gas concentration of the predetermined gas can be determined more accurately based on the internal data of the gas sensor.

In some embodiments, the determining the gas concentration of the predetermined gas based on the internal data includes:
    obtaining an alarm bit flag of the internal data;
    under the condition that the alarm bit flag is 1, determining that the gas concentration of the predetermined gas is higher than the concentration threshold; and
    under the condition that the alarm bit flag is 0, determining that the gas concentration of the predetermined gas is lower than or equal to the concentration threshold.

In this way, the alarm bit flag can be used to determine whether the gas concentration exceeds the concentration threshold.

In some embodiments, the test method includes:
    modifying the alarm bit flag from 0 to 1 if the gas concentration measured by the gas sensor is higher than the concentration threshold within a predetermined duration.

In this way, limiting the measuring time can accurately determine whether the battery cell has leakage.

In some embodiments, the sending a concentration exceedance signal when the gas concentration is higher than a concentration threshold includes:
    when the gas concentration is higher than the concentration threshold, controlling a switch to close so as to cause a control circuit to send a boolean signal, and using the boolean signal as the concentration exceedance signal.

In this way, using the boolean signal as the concentration exceedance signal facilitates subsequent processing of the concentration exceedance signal and simplifies the processing.

In some embodiments, the test method further includes:
    sending an alarm signal based on the concentration exceedance signal, where the alarm signal is used for causing an alarm apparatus to give an alarm.

In this way, the alarm apparatus gives an alarm based on the alarm signal and can notify the relevant personnel of the leakage of the battery cell in a timely manner.

In some embodiments, the sending an alarm signal based on the concentration exceedance signal includes:
    loading position information of the gas sensor from the concentration exceedance signal to form the alarm signal, and sending the alarm signal.

In this way, the alarm signal has the position information of the gas sensor, such that a position of the battery cell in which the leakage occurs can be determined based on a position of the sensor, thereby facilitating subsequent timely processing.

The test apparatus of the embodiments of this application includes:
    an obtaining module, configured to obtain a CAN signal output by a gas sensor, where the gas sensor is disposed on a test box, and a battery cell is placed in the test box;
    a determining module, configured to determine a gas concentration of a predetermined gas in the test box based on the CAN signal; and
    a sending module, configured to send a concentration exceedance signal when the gas concentration is higher than a concentration threshold.

In the test apparatus of the embodiments of this application, the concentration of the predetermined gas in the test box is monitored using the gas sensor disposed on the test box, and the concentration exceedance signal is sent when the gas concentration is higher than the concentration threshold, such that it is possible to determine, based on the gas concentration, whether the battery cell has a leakage failure.

The test system of the embodiments of this application includes:

a gas sensor, where the gas sensor is disposed on a test box, and a battery cell is placed in the test box; and a control circuit board, where the control circuit board includes a communication module, and the communication module is connected to the gas sensor and configured to: obtain a CAN signal output by the gas sensor, determine a gas concentration of a predetermined gas in the test box based on the CAN signal, and send a concentration exceedance signal when the gas concentration is higher than a concentration threshold.

In the test system of the embodiments of this application, the concentration of the predetermined gas in the test box is monitored using the gas sensor disposed on the test box, and the concentration exceedance signal is sent when the gas concentration is higher than the concentration threshold, such that it is possible to determine, based on the gas concentration, whether the battery cell has a leakage failure.

In some embodiments, the communication module is further configured to: read internal data of the gas sensor based on the CAN signal, and determine the gas concentration of the predetermined gas based on the internal data.

In this way, the gas concentration of the predetermined gas can be determined more accurately based on the internal data of the gas sensor.

In some embodiments, the communication module is further configured to: obtain an alarm bit flag of the internal data; under the condition that the alarm bit flag is 1, determine that the gas concentration of the predetermined gas is higher than the concentration threshold; and under the condition that the alarm bit flag is 0, determine that the gas concentration of the predetermined gas is lower than or equal to the concentration threshold.

In this way, the alarm bit flag can be used to determine whether the gas concentration exceeds the concentration threshold.

In some embodiments, the gas sensor is configured to modify the alarm bit flag from 0 to 1 if the gas concentration measured is higher than the concentration threshold within a predetermined duration.

In this way, limiting the measuring time can accurately determine whether the battery cell has leakage.

In some embodiments, the communication module is configured to: control a switch of the control circuit board to close when the gas concentration is higher than the concentration threshold so as to cause a control circuit to send a boolean signal, and use the boolean signal as the concentration exceedance signal.

In this way, using the boolean signal as the concentration exceedance signal facilitates subsequent processing of the concentration exceedance signal and simplifies the processing.

In some embodiments, the control circuit board further includes an output module, where the output module is configured to send an alarm signal based on the concentration exceedance signal; and the test system further includes an alarm controller, where the alarm controller is configured to control, based on the alarm signal, an alarm apparatus to give an alarm.

In this way, the alarm apparatus gives an alarm based on the alarm signal and can notify the relevant personnel of the leakage of the battery cell in a timely manner.

In some embodiments, the output module is further configured to: load position information of the gas sensor from the concentration exceedance signal to form the alarm signal, and send the alarm signal.

In this way, the alarm signal has the position information of the gas sensor, such that a position of the battery cell in which the leakage occurs can be determined based on a position of the sensor, thereby facilitating subsequent timely processing.

In some embodiments, the gas sensor is disposed on a side of the test box and located above a height midline of the side.

In this way, the gas sensor is subject to less interference, with more accurate measurement results.

A non-volatile computer-readable storage medium for computer executable instructions is provided. The computer executable instructions, when being executed by one or more processors, cause the processor(s) to execute the test method according to any one of the foregoing embodiments.

For additional aspects and advantages of this application, some will be given in the following description, and some will become apparent in the following description or will be understood in the practice of this application.

BRIEF DESCRIPTION OF DRAWINGS

The above and/or additional aspects and advantages of this application will become obvious and easy to understand from the description of the embodiments with reference to the following drawings.

DESCRIPTION OF EMBODIMENTS

Figure 1:
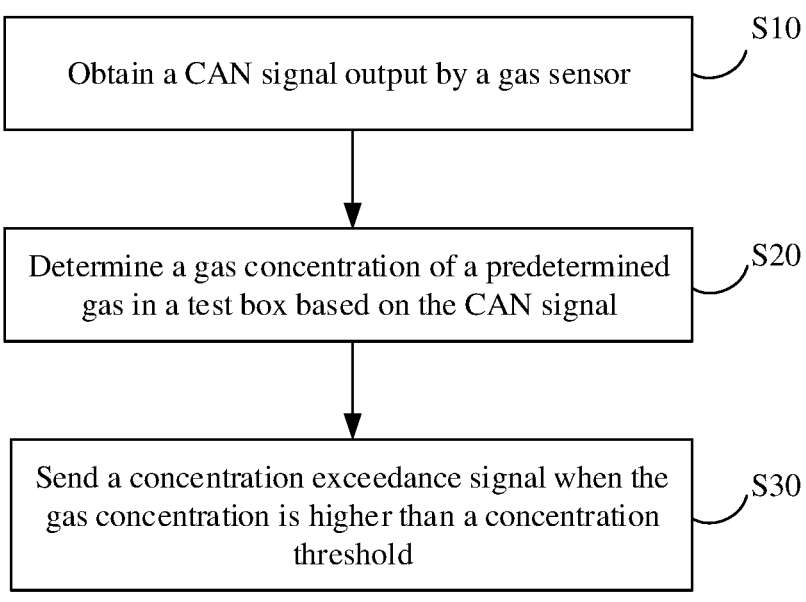
FIG. 1 is a schematic flowchart of a test method according to an embodiment of this application.

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "multiple" means more than two (inclusive). Similarly, "a plurality of groups" means more than two (inclusive) groups, and "a plurality of pieces" means more than two (inclusive) pieces.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also expanding.

During tests in the battery research and development stage, battery cells are prone to failure or suffer from leakage caused by corrosion and rupture of the housing. Under the condition that a battery cell suffers from leakage, moisture easily enters the battery cell, which makes the battery cell have the risk of thermal runaway. However, when the battery cell has slight leakage occurred, the voltage, SOC, insulation value, and the like of the battery cell are normal within a short period of time, so it is difficult to detect whether the battery cell has leakage occurred by using these parameters such as voltage in a timely and effective manner. For a battery cell being tested in a chamber, it is even more difficult to effectively detect whether the battery cell has leaked in the chamber. As a result, the leakage of the battery cell cannot be detected in a timely manner.

In order to solve the foregoing problems, the applicant has found through research that an electrolyte in the battery is typically a carbonate liquid, which is reductive in nature. In addition, the battery cell produces hydrocarbons, CO, and other reducing gases during the working cycle. Once the battery cell suffers from leakage, the volatiles of the electrolyte leak along with the gas-producing components, which causes a concentration of substances with reducing properties in the air to rise.

Based on this consideration, the applicant solves the problem that the leakage of the battery cell is difficult to detect, by providing a gas sensor on the chamber, detecting the concentration of reducing gases in the test box through the gas sensor, and thus determining whether the leakage of battery cells occurs according to the concentration of reducing gases detected.

Figure 2:
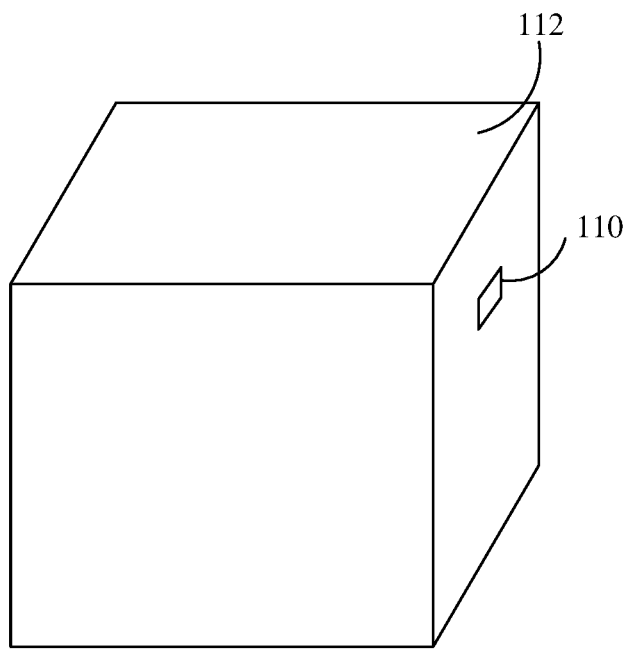
FIG. 2 is a three-dimensional view of a test box according to an embodiment of this application.

Referring to FIGS. 1 and 2, FIG. 1 is a schematic flowchart of a test method according to an embodiment of this application. FIG. 2 is a schematic three-dimensional view of a test box according to an embodiment of this application.

The test method of the embodiments of this application is used for battery cells. The test method includes the following steps.

S10. Obtain a CAN signal output by a gas sensor 110, where the gas sensor 110 is disposed on a test box 112, and a battery cell is placed in the test box 112.

S20. Determine a gas concentration of a predetermined gas in the test box 112 based on the CAN signal.

S30. Send a concentration exceedance signal when the gas concentration is higher than a concentration threshold.

Specifically, the battery cell may be used for electric apparatuses that use a battery as a power source or various energy storage systems that use a battery as an energy storage element. The electric apparatus may be but is not limited to a mobile phone, a tablet, a laptop computer, an electric toy, an electric tool, an electric bicycle, an electric car, a ship, or a spacecraft. Each battery cell may be a secondary battery or a primary battery, a lithium-sulfur battery, a sodium-ion battery, or a magnesium-ion battery, without being limited thereto. The battery cell may be cylindrical, flat, cuboid, or of other shapes.

The gas sensor 110 may use a semiconductor sensor, where the semiconductor sensor includes metal oxides or semiconductor oxide crystals. In an example, the semiconductor sensor works as follows: after the semiconductor sensor is preheated, the semiconductor sensor can absorb oxygen in the air on the crystal surface, and active electrons on the crystal surface are transferred to the oxygen adsorbed, thus leaving positive charge in a space charge layer of the crystals. In this way, the crystals form a potential barrier that hinders the flow of electrons. When a reducing gas is present around the gas sensor 110, the reducing gas reacts with the negatively charged oxygen atoms on the crystal surface, resulting in a decrease in the density of oxygen on the crystal surface. Therefore, a barrier height in the crystal boundary of the crystal decreases, and the decrease in the barrier height induces a decrease in the resistance of the sensor, generating a distinct electrical signal.

Certainly, the gas sensor 110 may be a sensor in other types, for example, the gas sensor 110 is a sensor such as an electrochemical sensor.

The CAN signal is a form of signal output by the gas sensor 110, and the CAN signal may include information such as a data generation time of the gas sensor 110. Based on the CAN signal, information detected from the gas sensor 110 can be obtained.

In this embodiment of this application, the test box 112 may also be called a chamber, which is an apparatus that can adjust the internal environment of the box. For example, the temperature inside the test box 112 can be adjusted up or down. For example, the temperature inside the test box 112 can be adjusted up by passing hot air into the test box 112.

Alternatively, the density of gas inside the test box 112 can be adjusted up or down. For example, the gas inside the test box 112 may be extracted by an extractor fan, thereby causing the density of gas inside the test box 112 to decrease.

The gas sensor 110 can be mounted on a wall of the test box 112. Specifically, a through-hole can be opened in the wall of the test box 112, and then the gas sensor 110 can be mounted at the through-hole and partially extend into the test box 112, such that the gas sensor 110 can effectively detect the predetermined gas in the test box 112.

In step S20, the predetermined gas may be a reducing gas, and the reducing gas is, for example, a gas such as carbon monoxide and hydrocarbons. As discussed above, when the gas sensor 110 is a semiconductor sensor, the gas sensor 110 can detect the reducing gas. In this way, the gas concentration of the predetermined gas can be determined based on the CAN signal output by the gas sensor 110. It should be noted that the determining the gas concentration of the predetermined gas may be determining a specific value of the gas concentration, or may be determining a range of the gas concentration. For example, the gas concentration may be determined to be equal to 15 ppm or may be determined to be greater than 15 ppm, where ppm (parts per million) is the number of units of volume of the predetermined gas per million units of the total volume of gas in the test box 112.

In step S30, the concentration threshold is a critical value for determining whether a battery cell suffers from leakage. The concentration threshold may be obtained based on experimentation. For example, the concentration threshold is 50 ppm. In other words, the concentration exceedance signal is sent when the gas concentration is greater than 50 ppm.

The concentration exceedance signal may be an analog signal or a digital signal. For example, the concentration exceedance signal is a high level signal. Therefore, based on the concentration exceedance signal, it can be accurately determined that the gas concentration of the predetermined gas in the test box 112 exceeds the standard, and thus the leakage of the battery cell can be determined.

To sum up, in the test method of this embodiment of this application, the concentration of the predetermined gas in the test box 112 is monitored using the gas sensor 110 disposed on the test box 112, and the concentration exceedance signal is sent when the gas concentration is higher than the concentration threshold. In this way, it is possible to determine, based on the gas concentration, whether the battery cell has a leakage failure.

Figures 3, 4:
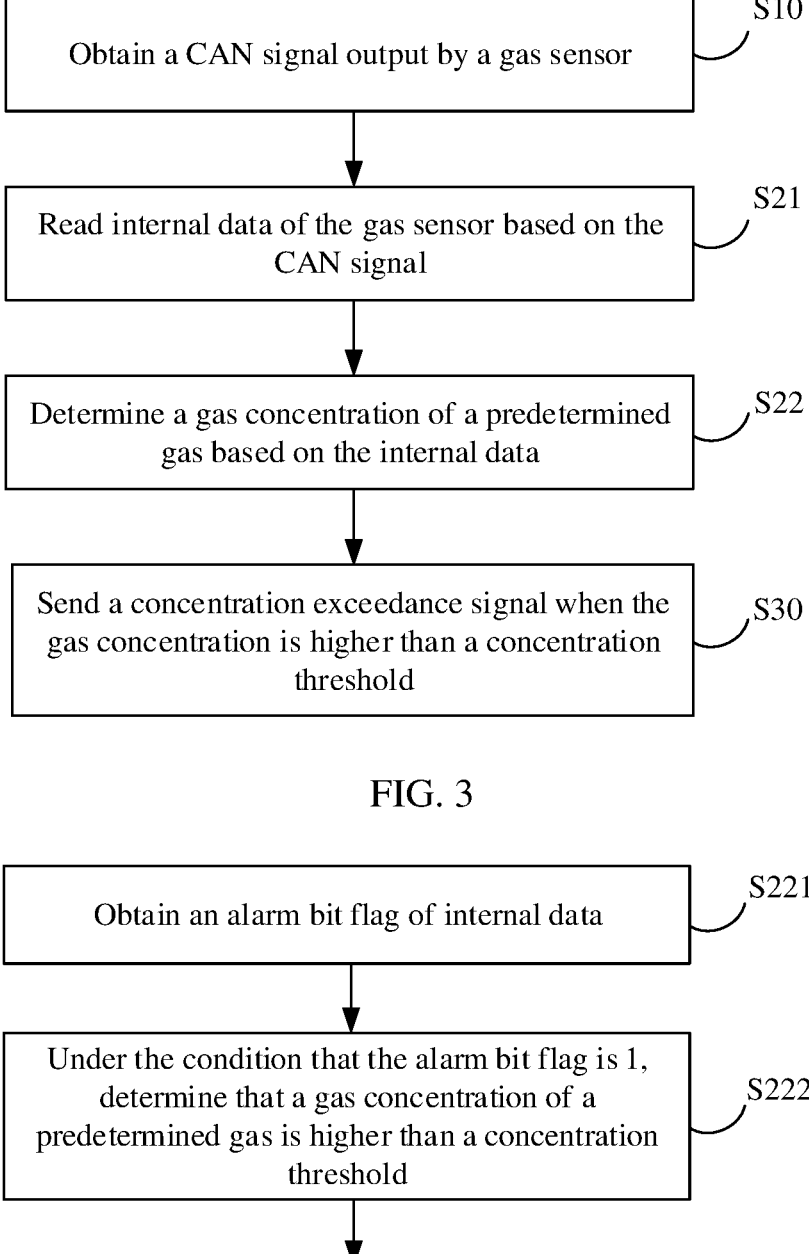
FIG. 3 is a schematic flowchart of a test method according to an embodiment of this application.
FIG. 4 is a schematic flowchart of a test method according to an embodiment of this application.

Referring to FIG. 3, in some embodiments, the determining (S20) a gas concentration of a predetermined gas in the test box 112 based on the CAN signal includes the following steps.

S21. Read internal data of the gas sensor 110 based on the CAN signal.

S22. Determine the gas concentration of the predetermined gas based on the internal data.

Specifically, based on a protocol for the CAN signal, the CAN signal may not be able to directly load information about the gas concentration, meaning that after the CAN signal is analyzed, the information about the gas concentration may not be directly obtained. Therefore, based on the CAN signal, the internal data cached by the gas sensor 110 can be read directly such that the gas concentration of the predetermined gas can be obtained based on the internal data of the gas sensor 110.

For example, the CAN signal has an address of the gas concentration cached, by which the internal data of the gas sensor 110 can be read quickly to determine the gas concentration of the predetermined gas. In this way, the gas concentration of the predetermined gas can be determined more accurately based on the internal data of the gas sensor 110.

Referring to FIG. 4, in some embodiments, the determining (S22) the gas concentration of the predetermined gas based on the internal data includes the following steps.

S221. Obtain an alarm bit flag of the internal data.

S222. Under the condition that the alarm bit flag is 1, determine that the gas concentration of the predetermined gas is higher than the concentration threshold.

S223. Under the condition that the alarm bit flag is 0, determine that the gas concentration of the predetermined gas is lower than or equal to the concentration threshold.

Specifically, the alarm bit is a data storage bit indicating whether an event has occurred. In this embodiment of this application, the alarm bit is used to indicate a relationship between the gas concentration of the predetermined gas and the concentration threshold. An alarm bit flag may be represented by 0 or 1, such that an external device can easily read the alarm bit flag. In some embodiments, under the condition that the alarm bit flag is 1, the gas concentration of the predetermined gas is higher than the concentration threshold; and under the condition that the alarm bit flag is 0, the gas concentration of the predetermined gas is lower than or equal to the concentration threshold. In this way, by reading the alarm bit flag, it is possible to determine whether the gas concentration exceeds the concentration threshold, and then determine whether the concentration exceedance signal is sent. The setting of the alarm bit makes the data of the sensor easier to be analyzed for the external device when the external device reads the data, thus making the test method of this embodiment of this application easy to implement.

In some embodiments, the test method includes:

modifying the alarm bit flag from 0 to 1 if the gas concentration measured by the gas sensor 110 is higher than the concentration threshold within a predetermined duration.

Specifically, the predetermined duration is a duration for determining whether a leakage occurs in a single battery during the test. The predetermined duration may be determined based on experimentation. For example, the predetermined duration may be 20 minutes. In this way, limiting the measuring time can accurately determine whether the battery cell has leakage.

It should be noted that the start point of the predetermined duration may be a time point at which the test box 112 just starts working or may be any time point after the test box 112 works; and the end point of the predetermined duration is a time point that is counted from the start point and that reaches the predetermined duration.

Therefore, the predetermined duration may be multiple according to a start point of timing. For example, the start point of a first predetermined duration is the 1st minute, and the end point thereof is the 20th minute; and the start point of a second predetermined duration is the 2nd minute, and the end point thereof is the 21st minute.

Therefore, the alarm bit flag is modified from 0 to 1 provided that the gas concentration measured is higher than the concentration threshold within any one predetermined duration.

In some embodiments, the sending (S30) a concentration exceedance signal when the gas concentration is higher than a concentration threshold includes:

when the gas concentration is higher than the concentration threshold, controlling a switch to close so as to cause a control circuit to send a boolean signal, and using the boolean signal as the concentration exceedance signal.

Specifically, the switch is a device that controls the on-off of the circuit, and the switch may be a component such as a relay switch and a transistor switch. This application does not limit the specific type of the switch. The control circuit is a circuit that includes a switch and that can generate electrical signals. When the switch is closed, the control circuit can be in a working state and can generate an electrical signal, and when the switch is opened, the control circuit can be in a non-working state and cannot generate an electrical signal. The signal formed by the control circuit according to the closed or open state of the switch is the boolean signal. The boolean signal is similar to a pulse signal, and the boolean signal is an intermittent signal rather than a continuous signal.

Therefore, controlling the state of the switch can cause the control circuit to send a boolean signal, and then, using the boolean signal as the concentration exceedance signal makes the signal less difficult to analyze, which is conductive to subsequent processing of the concentration exceedance signal. Simpler processing makes the test method of this embodiment of this application easier to implement.

Figure 5:
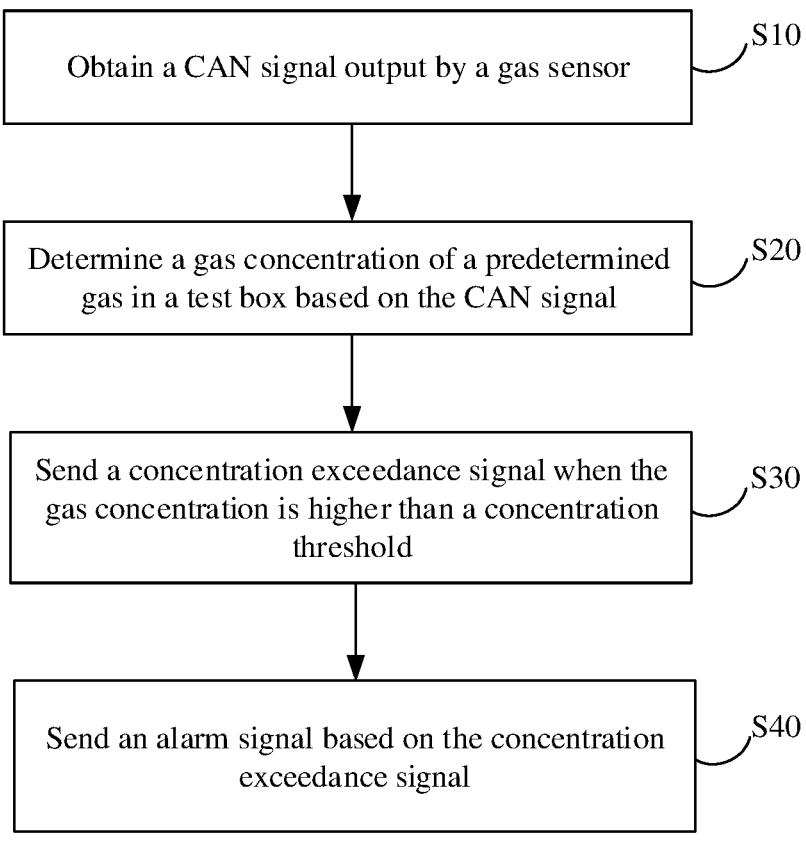
FIG. 5 is a schematic flowchart of a test method according to an embodiment of this application.

Referring to FIG. 5, in some embodiments, the test method further includes the following step.

Figure 6:
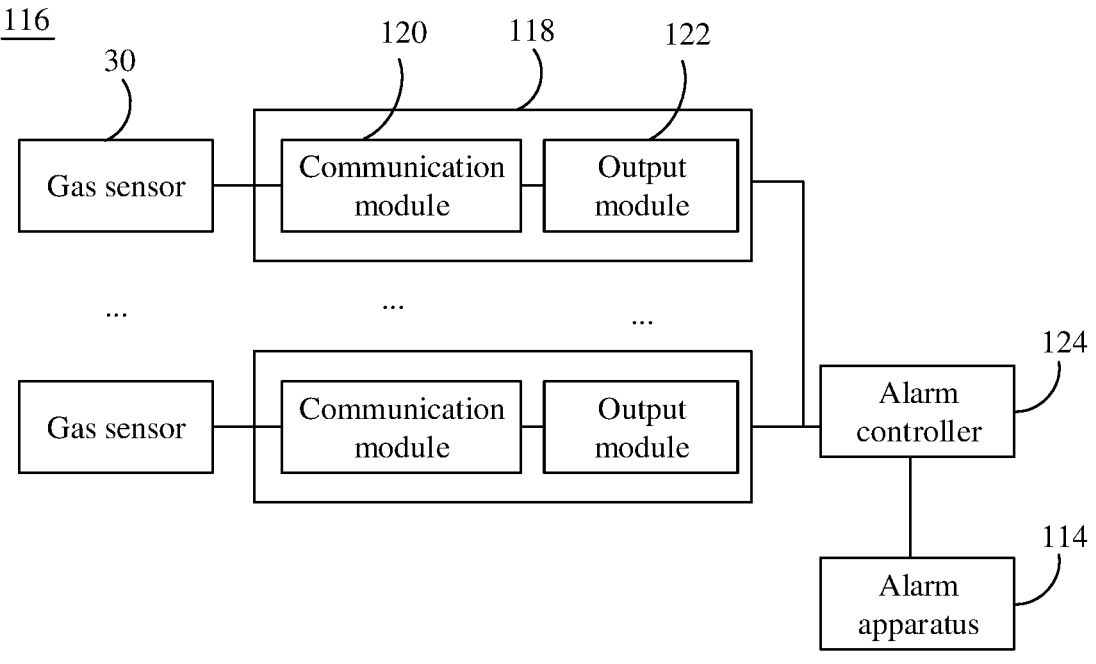
FIG. 6 is a schematic diagram of a structure of a test system according to an embodiment of this application.

S40. Send an alarm signal based on the concentration exceedance signal, where the alarm signal is used for causing an alarm apparatus 114 (as shown in FIG. 6) to give an alarm.

Specifically, the alarm signal is a control signal that causes the alarm apparatus 114 to give an alarm. In other words, the alarm apparatus 114 may give an alarm based on the control signal. The alarm signal may be in different types and/or different levels so as to indicate the risk of leakage of the battery cell. For example, the alarm apparatus 114 may give a light alarm and represent different levels of abnormality according to different color levels such as red, orange, yellow, and green. Certainly, in addition to color, the alarm apparatus 114 can also be caused to give different tones or audios to present different levels of abnormality on the basis of color, or to present different levels of abnormality individually. For example, the levels of abnormality are distinguished by alarm length, tone, or pitch. This embodiment of this application does not limit the alarm mode.

The alarm apparatus 114 can include a speaker, a display, and an indicator. When the alarm apparatus 114 is a speaker, the alarm apparatus 114 can give an audible alarm; when the alarm apparatus 114 is a display, the alarm apparatus 114 can give an alarm such as an image; and when the alarm apparatus 114 is an indicator, the alarm apparatus 114 can give a light alarm. In this way, the alarm apparatus 114 alerts according to the alarm signal, which can realize the early warning of a battery cell leakage event in a timely manner, can enable the relevant personnel to learn the problem of the leakage of the battery cell in a timely manner, and can facilitate the processing of test data (for example, the leakage time) so as to solve the problem of the leakage of the battery cell in a timely manner.

In some embodiments, the sending (S40) an alarm signal based on the concentration exceedance signal includes:

loading position information of the gas sensor 110 from the concentration exceedance signal to form the alarm signal, and sending the alarm signal.

Specifically, in the testing of battery cells, multiple battery cells may be tested at the same time. For example, there are multiple test boxes 112, and one battery cell may be placed within one test box 112, such that one test box 112 can test one battery cell. Because each temperature measurement test box 112 is provided with at least one gas sensor 110, there are multiple gas sensors 110.

In order to facilitate the management of data obtained from the measurement of the multiple gas sensors 110, the multiple gas sensors 110 can be connected to the same controller. In order to distinguish among the gas sensors 110, the multiple gas sensors 110 may be coded, and different codes correspond to different communication protocols on the controller, such that the gas sensors 110 at different positions can be identified by analyzing the communication protocols, and positions of the gas sensors 110 and the test box 112 can be easily located so as to deal with a failed battery cell in a timely manner.

Therefore, the alarm signal has the position information of the gas sensor 110, such that a position of the battery cell in which the leakage occurs can be determined based on a position of the sensor, thereby facilitating subsequent timely processing.

Referring to FIG. 6, this application further provides a test system 116. The test system 116 of this embodiment of this application includes a gas sensor 110 and a control circuit board 118, where the gas sensor 110 is disposed on a test box 112, and a battery cell is placed in the test box 112. The control circuit board 118 includes a communication module 120, and the communication module 120 is connected to the gas sensor 110 and configured to: obtain a CAN signal output by the gas sensor 110, determine a gas concentration of a predetermined gas in the test box 112 based on the CAN signal, and send a concentration exceedance signal when the gas concentration is higher than a concentration threshold.

Specifically, the control circuit board 118 is an integrated circuit board formed on the basis of a printed circuit board, on which electrical components such as a processing device and a control device are arranged so as to implement a predetermined function. The communication module is a circuit on the control circuit board 118 to implement a specific function, where the circuit herein includes a loop formed by connecting different components. The communication module may include a microcontroller unit (Microcontroller Unit, MCU), where the microcontroller unit can perform signal processing, for example, analysis of signals such as a CAN signal. Therefore, the communication module 120 of the control circuit board 118 can receive the CAN signal output by the gas sensor 110, process the CAN signal, for example, analyzing, and then send the concentration exceedance signal.

In conclusion, in the test system 116 of this embodiment of this application, the concentration of the predetermined gas in the test box 112 is monitored using the gas sensor 110 disposed on the test box 112, and the concentration exceedance signal is sent when the gas concentration is higher than the concentration threshold. In this way, it is possible to determine, based on the gas concentration, whether the battery cell has a leakage failure.

In some embodiments, the communication module 120 is further configured to: read internal data of the gas sensor 110 based on the CAN signal, and determine the gas concentration of the predetermined gas based on the internal data.

In this way, the gas concentration of the predetermined gas can be determined more accurately based on the internal data of the gas sensor 110.

In some embodiments, the communication module 120 is further configured to: obtain an alarm bit flag of the internal data; under the condition that the alarm bit flag is 1, determine that the gas concentration of the predetermined gas is higher than the concentration threshold; and under the condition that the alarm bit flag is 0, determine that the gas concentration of the predetermined gas is lower than or equal to the concentration threshold.

In this way, by reading the alarm bit flag, it is possible to determine whether the gas concentration exceeds the concentration threshold, and then determine whether the concentration exceedance signal is sent. The setting of the alarm bit makes the data of the sensor easier to be analyzed for the external device when the external device reads the data, thus making the test method of this embodiment of this application easy to implement.

In some embodiments, the gas sensor 110 is configured to modify the alarm bit flag from 0 to 1 if the gas concentration measured is higher than the concentration threshold within a predetermined duration.

In this way, limiting the measuring time can accurately determine whether the battery cell has leakage.

In some embodiments, the communication module 120 is configured to: when the gas concentration is higher than the concentration threshold, control a switch of the control circuit board 118 to close so as to cause a control circuit to send a boolean signal, and use the boolean signal as the concentration exceedance signal.

Therefore, controlling the state of the switch can cause the control circuit to send a boolean signal, and then, using the boolean signal as the concentration exceedance signal makes the signal less difficult to analyze, which is conductive to subsequent processing of the concentration exceedance signal. Simpler processing makes the test method of this embodiment of this application easier to implement. It should be noted that the control circuit may be part of the circuit of the communication module 120, or the communication module 120 includes the control circuit.

Referring to FIG. 6, in some embodiments, the control circuit board 118 further includes an output module 122, where the output module 122 is configured to send an alarm signal based on the concentration exceedance signal.

The test system 116 further includes an alarm controller 124, where the alarm controller 124 is configured to control, based on the alarm signal, an alarm apparatus 114 to give an alarm.

Specifically, the output module 122 is a circuit on the control circuit board 118 to implement a specific function, and the output module 122 has a function of analyzing the concentration exceedance signal. As discussed above, the concentration exceedance signal output by the communication module 120 may be a boolean signal, and the boolean signal may be obtained by the output module 122, causing the output module 122 to output an alarm signal based on the boolean signal.

The alarm controller 124 is, for example, a microprocessor, and the alarm controller 124 can send instructions, thereby causing the alarm apparatus 114 to work according to the instructions sent by the alarm controller 124.

In this way, the alarm apparatus 114 gives an alarm based on the alarm signal and can notify the relevant personnel of the leakage of the battery cell in a timely manner.

In some embodiments, the output module 122 is further configured to: load position information of the gas sensor 110 from the concentration exceedance signal to form the alarm signal, and send the alarm signal.

Specifically, as discussed above, the number of test boxes 112 may be multiple, and one test box 112 is correspondingly provided with one gas sensor 110; and on such basis, each gas sensor 110 may be connected to one communication module 120, and each communication module 120 may be connected to one output module 122. In other words, the gas sensor 110 and the output module 122 may have a one-to-one correspondence. The position information of the gas sensor 110 may be pre-stored in the output module 122. For example, the output module 122 has an encoder through which the gas sensor 110 can be encoded to form the position information of the gas sensor 110. After the output module 122 receives the concentration exceedance signal, the output module 122 may perform processing on the position information of the gas sensor 110 added in the concentration exceedance signal and form an alarm signal. It can be understood that, at this point, the alarm signal has the position information of the gas sensor 110, and the alarm controller 124 can control the alarm apparatus 114 to send, based on the alarm signal, alarm information, for example, a position of a battery cell failed.

In this way, the alarm signal has the position information of the gas sensor 110, such that a position of the battery cell in which the leakage occurs can be determined based on a position of the sensor, which is convenient for the on-site personnel to deal with the failed battery cell in a timely manner so as to avoid risks such as explosion.

It should be noted that there are multiple control circuit boards 118, with each control circuit board 118 including one communication module 120 and one output module 122. Alternatively, there may be one control circuit board 118, where one control circuit board 118 includes multiple communication modules 120 and multiple output modules 122, and the communication modules 120 and the output modules 122 can be connected in a one-to-one correspondence. Certainly, in the case of multiple control circuit boards 118, the number of communication modules 120 and the number of output modules 122 on each control circuit board 118 may not be the same, but in multiple control circuit boards 118, the total number of communication modules 120 is the same as the total number of output modules 122, and one communication module 120 is connected to one corresponding output module 122.

In some embodiments, the gas sensor 110 is disposed on a side of the test box 112 and located above a height midline of the side of the test box 112.

Generally, the temperature inside the test box 112 can be changed by circulating air in the test box 112, for example, hot air can be passed into the test box 112 to cause the temperature inside the test box 112 to increase. An air opening of the test box 112 is generally located in the lower part of the front and rear panels of the test box 112. In such a way, within the test box 112, the fluidity of the gas in the lower space of the test box 112 is relatively large, the fluidity of the gas in the upper space of the test box 112 is relatively small, and a reducing gas generally tends to be located in the upper space of the test box 112.

The side of the test box 112 is relative to the front and back sides and the top and bottom sides of the test box 112, the side of the test box 112 connects the top and bottom sides and the front and back sides of the test box 112, and the height midline of the side is a line that divides the side into equal heights in the height direction. The gas is located above the height midline of the side, meaning that the height midline passes through the gas sensor 110 or the gas sensor 110 deviates from the height midline.

Thus, disposing the gas sensor 110 above the height midline of the side of the test box 112 results in less interference to the gas sensor 110 and more accurate measurement results.

In an example, the gas sensor 110 has a length, width, and height of 76.8 mm×38 mm×19.5 mm, and the gas sensor 110 can be mounted on the side of the test box 112 at a distance of about 10 cm from the top.

It should be noted that the explanation description of the test method of the foregoing embodiment is applicable to the test system 116 of this application, and for other unexpanded parts of the test system 116 of this embodiment of this application, reference is made to the corresponding parts of the foregoing test method. Details are not repeated herein.

Figure 7:
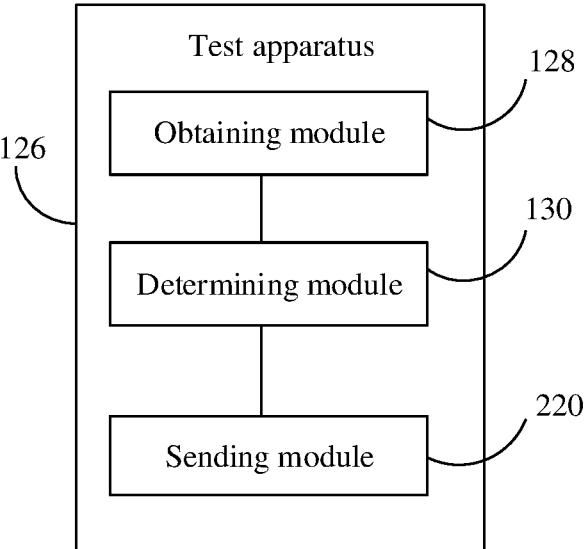
FIG. 7 is a schematic diagram of a module of a test apparatus according to an embodiment of this application.

Referring to FIG. 7, the test apparatus 126 of this embodiment of this application includes an obtaining module 128, a determining module 130, and a sending module 132. The obtaining module 128 is configured to obtain a CAN signal output by a gas sensor 110, where the gas sensor 110 is disposed on a test box 112, and a battery cell is placed in the test box 112; the determining module 130 is configured to determine a gas concentration of a predetermined gas in the test box 112 based on the CAN signal; and the sending module 132 is configured to send a concentration exceedance signal when the gas concentration is higher than a concentration threshold.

In the test apparatus 126 of this embodiment of this application, the concentration of the predetermined gas in the test box 112 is monitored using the gas sensor 110 disposed on the test box 112, and the concentration exceedance signal is sent when the gas concentration is higher than the concentration threshold. In this way, it is possible to determine, based on the gas concentration, whether the battery cell has a leakage failure.

In some embodiments, the determining module 130 is further configured to: read internal data of the gas sensor 110 based on the CAN signal, and determine the gas concentration of the predetermined gas based on the internal data.

In this way, the gas concentration of the predetermined gas can be determined more accurately based on the internal data of the gas sensor 110.

In some embodiments, the determining module 130 is further configured to: obtain an alarm bit flag of the internal data; under the condition that the alarm bit flag is 1, determine that the gas concentration of the predetermined gas is higher than the concentration threshold; and under the condition that the alarm bit flag is 0, determine that the gas concentration of the predetermined gas is lower than or equal to the concentration threshold.

In this way, the alarm bit flag can be used to determine whether the gas concentration exceeds the concentration threshold.

In some embodiments, the determining module 132 is configured to: when the gas concentration is higher than the concentration threshold, control a switch of the control circuit board 118 to close so as to cause a control circuit to send a boolean signal, and use the boolean signal as the concentration exceedance signal.

In this way, using the boolean signal as the concentration exceedance signal facilitates subsequent processing of the concentration exceedance signal and simplifies the processing.

In some embodiments, the sending module 132 is configured to send an alarm signal based on the concentration exceedance signal, where the alarm signal is used to cause the alarm apparatus 114 to give an alarm. In this way, the alarm apparatus 114 gives an alarm based on the alarm signal and can notify the relevant personnel of the leakage of the battery cell in a timely manner.

In some embodiments, the sending module 132 is further configured to: load position information of the gas sensor

110 from the concentration exceedance signal to form the alarm signal, and send the alarm signal.

In this way, the alarm signal has the position information of the gas sensor 110, such that a position of the battery cell in which the leakage occurs can be determined based on a position of the sensor, thereby facilitating subsequent timely processing.

It should be noted that the explanation description of the test method of the foregoing embodiment is applicable to the test apparatus 126 of this application, and for other unexpanded parts of the test apparatus 126 of this embodiment of this application, reference is made to the corresponding parts of the foregoing test method. Details are not repeated herein.

A non-volatile computer-readable storage medium for computer executable instructions is provided. The computer executable instructions, when being executed by one or more processors, cause the processor(s) to execute the test method according to any one of the foregoing embodiments.

In the description of this specification, reference to the description of the terms "an embodiment", "some embodiments", "an example of the embodiment", "an example", "a specific example", or "some examples" means that particular features, structures, materials or characteristics described in connection with the embodiments or examples are included in at least one embodiment or example of this application. In this specification, descriptions of examples of the above terms do not necessarily refer to the same embodiment or example. Furthermore, the particular features, structures, materials, or characteristics described may be combined in a suitable manner in any one or more embodiments or examples.

Any process or method in the flowcharts or described in other manners in this specification may be understood to denote a module, segment, or portion of code that includes one or more executable instructions for implementing steps of a specified logical function or process. The scope of the preferred implementations of this application includes additional implementations in which functions may be performed not in the order shown or discussed, but at substantially the same time or in reverse order depending on the involved functions. This should be understood by those skilled in the art to which the embodiments of this application relate.

The logic and/or steps represented in the flowchart or otherwise described herein, for example, may be considered to be a definitive list of executable instructions for implementing the logical functions, which may be specifically implemented in any computer-readable medium for use by, or in combination with, an instruction execution system, apparatus, or device (for example, a computer-based system, a system including a processing module, or other systems that can obtain instructions from an instruction execution system, apparatus, or device and execute the instructions). For the purposes of this specification, a "computer-readable medium" may be any apparatus that can contain, store, communicate, transfer, or transmit a program for use in or in conjunction with the instruction execution system, apparatus, or device. More specific examples of the computer-readable medium (a non-exhaustive list) include the following: an electrically connected portion with one or more wiring (electronic apparatus), a portable computer disk cartridge (magnetic apparatus), a random access memory (RAM), a read-only memory (ROM), an erasable editable read-only memory (EPROM or flash memory), a fiber optic apparatus, and a portable compact disc read-only memory (CDROM). Alternatively, the computer-readable medium may even be a paper on which the program may be printed or other suitable medium, because the program may be obtained electronically, for example, through optical scanning of the paper or other medium, followed by editing, decoding, or, if necessary, processing in other suitable ways, and then the program is stored in a computer memory.

It should be understood that the parts of the embodiments of this application can be implemented by hardware, software, firmware, or a combination thereof. In the foregoing embodiments, multiple steps or methods may be implemented by software or firmware stored in memory and executed by a suitable instruction execution system. For example, if implemented by hardware, as in another embodiment, they may be implemented by any one of the following techniques known in the art or by a combination thereof: a discrete logic circuit with a logic gate circuit for implementing the logic function on data signals, an application-specific integrated circuit with a suitable combination of logic gate circuits, a programmable gate array (PGA), a field programmable gate array (FPGA), and the like.

Persons of ordinary skill in the art can understand that all or some of the steps of the foregoing method embodiment can be completed by a program to instruct relevant hardware, where the program may be stored in a computer-readable storage medium, and when the program is executed, one of or a combination of the steps of the method embodiment are included.

In addition, function units in the embodiments of this application may be integrated into one processing module, or each of the units may exist alone physically, or two or more units may be integrated into one module. The integrated module may be implemented in a form of hardware, or may be implemented in a form of a software functional module. When the integrated module is implemented in the form of a software functional module and sold or used as an independent product, the integrated module may also be stored in a computer-readable storage medium. The storage medium mentioned above may be a read-only memory, a disk, a compact disc, or the like.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A test method used for battery cells, comprising:
obtaining a CAN signal output by a gas sensor, wherein the gas sensor is disposed on a test box, and a battery cell is in the test box;
determining a gas concentration of a predetermined gas in the test box based on the CAN signal; and
sending a concentration exceedance signal when the gas concentration is higher than a concentration threshold, wherein determining the gas concentration of a predetermined gas in the test box comprises:

reading data generated by the gas sensor based on the CAN signal; and
determining the gas concentration of the predetermined gas based on data generated by the gas sensor that comprises:
obtaining an alarm bit flag based on the gas concentration of the predetermined gas;
under the condition that the alarm bit flag is 1, determining that the gas concentration of the predetermined gas is higher than the concentration threshold; and
under the condition that the alarm bit flag is 0, determining that the gas concentration of the predetermined gas is lower than or equal to the concentration threshold.

2. The test method according to claim 1, wherein the test method comprises:
modifying the alarm bit flag from 0 to 1 if the gas concentration of the predetermined gas is higher than the concentration threshold within a predetermined duration.

3. The test method according to claim 1, wherein sending a concentration exceedance signal when the gas concentration is higher than a concentration threshold comprises:
when the gas concentration is higher than the concentration threshold, controlling a switch to close so as to cause a control circuit to send a boolean signal, and using the boolean signal as the concentration exceedance signal.

4. The test method according to claim 1, wherein the test method further comprises:
sending an alarm signal based on the concentration exceedance signal, wherein the alarm signal is used for causing an alarm apparatus to give an alarm.

5. The test method according to claim 4, wherein the sending the alarm signal based on the concentration exceedance signal comprises:
loading position information of the gas sensor from the concentration exceedance signal to form the alarm signal, and sending the alarm signal.

6. A non-volatile computer-readable storage medium comprising computer executable instructions, wherein the computer executable instructions, when being executed by one or more processors, cause the processor(s) to execute the test method according to claim 1.

7. A test system, comprising:
a gas sensor, wherein the gas sensor is disposed on a test box, and a battery cell is in the test box; and
a control circuit board, wherein the control circuit board comprises a communication module, and the communication module is connected to the gas sensor and configured to: obtain a CAN signal output by the gas sensor, determine a gas concentration of a predetermined gas in the test box based on the CAN signal, and send a concentration exceedance signal when the gas concentration is higher than a concentration threshold, wherein the communication module is further configured to: read data of the gas sensor based on the CAN signal, and determine the gas concentration of the predetermined gas based on the data generated by the gas sensor; wherein, the communication module is further configured to: obtain an alarm bit flag of the data; under the condition that the alarm bit flag is 1, determine that the gas concentration of the predetermined gas is higher than the concentration threshold; and under the condition that the alarm bit flag is 0, determine that the gas concentration of the predetermined gas is lower than or equal to the concentration threshold.

8. The test system according to claim 7, wherein the gas sensor is configured to modify the alarm bit flag from 0 to 1 if the gas concentration measured is higher than the concentration threshold within a predetermined duration.

9. The test system according to claim 7, wherein the communication module is configured to: when the gas concentration is higher than the concentration threshold, control a switch of the control circuit board to close so as to cause a control circuit to send a boolean signal, and use the boolean signal as the concentration exceedance signal.

10. The test system according to claim 7, wherein the control circuit board further comprises an output module, wherein the output module is configured to send an alarm signal based on the concentration exceedance signal; and the test system further comprises an alarm controller, wherein the alarm controller is configured to control, based on the alarm signal, an alarm apparatus to give an alarm.

11. The test method according to claim 10, wherein the output module is further configured to: load position information of the gas sensor from the concentration exceedance signal to form the alarm signal, and send the alarm signal.

12. The test system according to claim 7, wherein the gas sensor is disposed on a side of the test box and located above a height midline of the side.

* * * * *